US009272951B1

(12) United States Patent
Hills et al.

(10) Patent No.: US 9,272,951 B1
(45) Date of Patent: *Mar. 1, 2016

(54) LOW PH COLLOIDAL SILICA COMPOSITIONS FOR APPLICATION TO CONCRETE

(71) Applicant: ARRIS TECHNOLOGIES, LLC, Bondurant, WY (US)

(72) Inventors: Dal N. Hills, Midway, UT (US); Kent Barrus, Provo, UT (US)

(73) Assignee: Arris Technologies, LLC, Bondurant, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,959

(22) Filed: Apr. 4, 2015

Related U.S. Application Data

(60) Continuation of application No. 14/508,710, filed on Oct. 7, 2014, now Pat. No. 8,999,056, which is a division of application No. 12/366,584, filed on Feb. 5, 2009, now Pat. No. 8,852,334.

(60) Provisional application No. 61/027,366, filed on Feb. 8, 2008, provisional application No. 61/026,427, filed on Feb. 5, 2008.

(51) Int. Cl.
| | |
|---|---|
| C04B 24/28 | (2006.01) |
| C04B 22/04 | (2006.01) |
| C04B 22/06 | (2006.01) |
| C09D 1/00 | (2006.01) |

(52) U.S. Cl.
CPC .. *C04B 22/06* (2013.01); *C09D 1/00* (2013.01)

(58) Field of Classification Search
CPC .......... C04B 24/28; C04B 22/04; C04B 22/06
See application file for complete search history.

(56) References Cited

U.S. PATENT DOCUMENTS

| | | | |
|---|---|---|---|
| 3,976,497 A | 8/1976 | Clark | |
| 4,144,074 A | 3/1979 | Itoh et al. | |
| 4,273,813 A | 6/1981 | Meddaugh | |
| 4,330,446 A | 5/1982 | Miyosawa | |
| 5,370,919 A | 12/1994 | Fieuws et al. | |
| 5,431,852 A | 7/1995 | Kaijou | |
| 5,584,921 A | 12/1996 | Wagner et al. | |
| 5,895,688 A | 4/1999 | Bertoncini et al. | |
| 5,932,000 A | 8/1999 | Bergqvist et al. | |
| 5,945,169 A | 8/1999 | Netti et al. | |
| 6,155,907 A | 12/2000 | Jones | |
| 6,187,851 B1 | 2/2001 | Netti et al. | |
| 6,454,632 B1 | 9/2002 | Jones et al. | |
| 6,800,130 B2 | 10/2004 | Greenwood et al. | |
| 7,608,143 B2 | 10/2009 | Brown | |
| 7,732,497 B2 | 6/2010 | Cumberland et al. | |
| 7,737,195 B2 | 6/2010 | Gimvang | |
| 8,092,588 B2 | 1/2012 | Bowers | |
| 8,852,334 B1 | 10/2014 | Hills et al. | |
| 8,999,056 B1* | 4/2015 | Hills et al. | 106/600 |
| 2006/0178463 A1 | 8/2006 | Sacks | |
| 2007/0129478 A1 | 6/2007 | Nakamura et al. | |
| 2008/0081217 A1 | 4/2008 | Bowers | |
| 2008/0261024 A1 | 10/2008 | Xenopoulos et al. | |
| 2009/0050018 A1 | 2/2009 | Kishimoto | |
| 2009/0110834 A1 | 4/2009 | Gimvang | |
| 2009/0142604 A1 | 6/2009 | Imai et al. | |
| 2009/0169750 A1 | 7/2009 | Wilkins et al. | |
| 2011/0111216 A1 | 5/2011 | Bowers | |

FOREIGN PATENT DOCUMENTS

JP          2004314328 A      11/2004

OTHER PUBLICATIONS

Roberts, William O., "Manufacturing and Applications of Water-Borne Colloidal Silica," book Colloidal Silica: Fundamentals and Applications, CRC Press, Surfactant Science Series, vol. 131, 2006, p. 167.

Aquron 2000, Sub-surface Molecular Bonding & Waterproofing Solution Treatment for Concrete, pp. C1-C20, Markham Distributing, Aquron Corporation, Apr. 2002.

Lab Korea, Colloidal Silica, pp. 1-9, http.//www.labkorea.com/products/chemical/silica/colloidalsilica.html, printed Oct. 18, 2004.

EKA CHEMICALS, Basic know-how about silica, 8 pages, archived Mar. 21, 2006, https://web.archive.org/web/20060617043238/http://www.colloidalsilica.com/eka.asp.

Northwest Stone Restoration, Proposal, Invoice and Credit Memo dated Dec. 14, 2004 (3 pages).

Atech Solutions PTY LTD, Atech Plus Concrete Solutions, Savvy Densifier, One application floor hardener, densifier & dust-sealer (2 pages),undated.

SILCO2 International INC., Invoice for concentrated silicas, dated Aug. 23, 2006 (1 page).

Sustainable Flooring Solutions, Inc., Purchase Invoice from Silco2 International Inc., dated Jan. 8, 2009 (4 pages).

Sleeper, Brad, Letter on behalf of Sustainable Flooring Solutions to Larry Lindland of Silco2 International Inc., dated May 17, 2007 (1 page).

(Continued)

*Primary Examiner* — Paul Marcantoni
(74) *Attorney, Agent, or Firm* — Durham Jones & Pinegar, P.C.

(57) ABSTRACT

A composition for hardening concrete that has a pH of less than 10, and may have a pH of 8 or less. Thus, the hardening composition may be free of or substantially free of alkaline materials. The hardening composition is water-based and includes silica particles and stabilizer, which may be present on portions of the surfaces of the silica particles. The stabilizer may be aluminum-based (e.g., it may comprise alumina, etc.). In use, the hardening composition is applied to the surface of concrete, either alone, with curing compounds, or as part of a polishing process. Any residue that remains on the treated surface may simply be swept, blown, or sprayed away.

20 Claims, No Drawings

(56) References Cited

OTHER PUBLICATIONS

Lythic Solutions, Inc., Lythic Solutions Concrete Curing Agent, A Green Solution for Green Concrete (1 page), undated.

Xtreme Hard—Concrete Hardener and Densifier, Material Safety Data Sheet, Prepared Aug. 15, 2007, Revised Mar. 25, 2008.

* cited by examiner

LOW PH COLLOIDAL SILICA COMPOSITIONS FOR APPLICATION TO CONCRETE

CROSS-REFERENCE TO RELATED APPLICATIONS

This application is a continuation of U.S. patent application Ser. No. 14/508,710, filed on Oct. 7, 2014, and titled LOW pH COMPOSITIONS FOR HARDENING CONCRETE ("the '710 Application"), now U.S. Pat. No. 8,999,056, issued on Apr. 7, 2015. The '710 Application is a divisional of U.S. patent application Ser. No. 12/366,584, filed on Feb. 5, 2009, and titled LOW pH COMPOSITIONS FOR HARDENING CONCRETE AND ASSOCIATED METHODS ("the '584 Application"), now U.S. Pat. No. 8,852,334, issued on Oct. 7, 2014. Claims for the benefit of priority to the Feb. 8, 2008, filing date of U.S. Provisional Patent Application No. 61/027,366, titled LOW pH COMPOSITIONS FOR HARDENING CONCRETE AND ASSOCIATED METHODS ("the '366 Provisional Application") and the Feb. 5, 2008, filing date of U.S. Provisional Patent Application No. 61/026,427, titled LOW pH COMPOSITIONS FOR HARDENING CONCRETE AND ASSOCIATED METHODS ("the '427 Provisional Application") were made in the '584 Application pursuant to 35 U.S.C. §119(e). The entire disclosure of each of the '710 Application, the '584 Application, the '366 Provisional Application and the '427 Provisional Application is, by this reference, incorporated herein.

TECHNICAL FIELD

The present invention, in various embodiments, relates generally to chemical compositions and to methods for treating concrete, masonry, or stone, and, more specifically, to chemical compositions for hardening concrete, masonry, and stone that have a pH of less than 10, as well as to methods relating to the use of such compositions.

BACKGROUND

When concrete hardens or cures, calcium hydroxide (Ca(OH)$_2$, or "free lime") forms in small "deposits" throughout the substrate. Calcium hydroxide is a soft, weak material. Consequently, deposits of calcium hydroxide that are present at surfaces of concrete can, over time, compromise the integrity of the concrete.

Various compounds are known to be useful for reacting with calcium hydroxide to harden concrete, masonry, and stone. These compounds include silicas, silicates, siliconates, and mixtures of silicates and siliconates. The silicas, silicates, and/or siliconates of these materials react chemically with soft, weak calcium hydroxide to form stronger materials, densifying and strengthening the treated surface.

Silicas, silicates, and siliconates are widely available in water-based, or aqueous, solutions. These solutions are typically alkaline, or basic, with a pH of 10 or more. The relatively high pH "stabilizes" these solutions by imparting the suspended silica, silicate, and/or siliconate particles with a negative, repulsive charge that prevents the particles from aggregating and, thus, from falling out of, or precipitating from, the solution. When the pH of a conventional hardening solution drops below 10 (e.g., to 8), the effective negative charge on the particles decreases. As a result, the particles no longer repel one another. Instead, they begin to aggregate and precipitate. Stated another way, the solution destabilizes. From the foregoing, it is apparent that conventional concrete hardeners remain stable over a relatively narrow pH range.

When conventional hardeners that have been applied to concrete, masonry, or stone surfaces puddle, they leave a hard, white residue that is difficult to remove, often requiring additional chemical treatments, scrubbing, scraping, sanding, polishing, or other labor-intensive processes. As a consequence, an undesirably significant amount of labor is often required to treat concrete, masonry, or stone with conventional hardeners.

SUMMARY

In one aspect, the present invention includes compounds for hardening concrete, masonry, or stone. For the sake of simplicity, the term "concrete," as used herein, includes concrete, masonry, stone, and other similar materials.

Hardening compositions that incorporate teachings of the present invention include particles that remain in solution at, or stable over, a relatively low pH (e.g., at a pH of about 3, at a pH of about 3.5, etc.), at a substantially neutral pH, or over a relatively large pH range (e.g., at a pH of about 4 to about 7, at a pH of about 3.5 to about 10.5, etc.). Due to the stability of such compositions at substantially neutral pH (e.g., at a pH of 8 or less), they also may be referred to herein as "low pH hardening compositions" or, even more simply, as "low pH compositions." The low pH of hardening compositions of the present invention may be due, at least in part, to their lack or substantial lack of alkaline materials, such as sodium or potassium or lithium.

In a specific embodiment, such a hardening composition includes particles (e.g., silica particles, etc.) and a stabilizer that comprises an aluminum compound (e.g., aluminum, aluminum oxide (alumina), etc.). The aluminum compound may be present at or on portions of the surfaces of the particles. In addition to the particles and the stabilizer, the compound may include a surfactant (e.g., an anionic surfactant, a non-ionic surfactant, etc.).

Methods for formulating low pH hardening compounds are also within the scope of the present invention.

According to another aspect, the present invention includes methods for hardening concrete. Such methods may simply include application of a low pH hardening composition to fresh concrete or fully cured concrete. In some embodiments, the low pH hardening composition may be applied to a surface of the concrete just before or during polishing.

In another aspect, the present invention includes methods for cleaning a surface of concrete following the application of a hardening composition to the surface. One embodiment of such a method consists essentially of sweeping, blowing, or spraying residue of the hardening composition from the surface of the concrete to substantially remove the residue from the surface.

Other aspects of the invention, as well as their features and advantages, will become apparent to those in the art through consideration of the ensuing description and the appended claims.

DETAILED DESCRIPTION

An embodiment of a hardening composition according to the present invention includes colloidal silica particles that are suspended in a water-based, or aqueous, solution. A stabilizer, which prevents aggregation of the silica particles and their precipitation from solution, may be present on portions of the surfaces of the silica particles. The stabilizer may comprise an aluminum compound, such as aluminum or aluminum oxide. In addition to the water, the silica particles, and the stabilizer, the hardening composition may, in some embodiments, include a surfactant, which also facilitates suspension of the silica particles in the water.

The silica particles remain suspended in the hardening composition at a relatively low, substantially neutral (e.g., pH=6 to 8) or acidic pH. As an example, the silica particles may remain in solution at a pH of as low as about 3 or about 3½ and as high as about 10 or about 10½. In a more specific example, the pH of a hardening composition of the present invention may be about 4 to about 7. In an even more specific example, a hardening composition that incorporates teachings of the present invention may have a pH of about 3½ to about 7.

In various embodiments, the silica particles and stabilizer of a hardening composition may be provided as a colloidal silica suspension that includes silica particles having nominal sizes (e.g., diameters) of from about 3 nm to about 50 nm with an aluminum-based stabilizer.

The colloidal silica suspension available from Grace Davison of Columbia, Md., as LUDOX® HSA is an example of a colloidal silica suspension that falls within the scope of the teachings of the present invention. That colloidal silica includes a silica content of 29.0% to 31.0%, by weight of the solution, with a nominal particle size (e.g., diameter) of 12 nm and a pH of 3.5 to 5.0.

The colloidal silica suspension may comprise as little as about 5% of the weight of the hardening compound for applications in which the surface that is to be treated is dense, about 15% to about 20% of the weight of the hardening composition when the surface to be treated is new concrete, or as much as about 50% of the weight of the hardening composition when the surface to be treated is highly porous, as is often the case with old concrete. The amount of silica included in the hardening composition may be tailored to provide the desired treatment effect (e.g., hardening, polishing, etc.) without requiring an unnecessarily large number of applications (e.g., more than one application) and while minimizing the amount of residue that remains on a surface after treatment of the surface, or minimizing wastage of the silica. In some embodiments, the amount of silica may be tailored to leave no residue on the treated surface.

Embodiments of hardening compositions that include surfactants may include an anionic (i.e., negatively charged) surfactant, such as NIAPROOF®, Anionic, Surfactant 08 from Niacet or a non-ionic (i.e., no electrical charge) surfactant, such as the polyether siloxane copolymer available from Evonik Industries' Tego brand of Essen, Germany, as TEGO® Wet KL-245. The surfactant may account for as little as about 0.1% of the weight of the hardening composition, or as much as about 2% of the weight of the hardening composition.

Some embodiments of hardening compositions according to the present invention may altogether lack a surfactant.

The remainder, or balance, of the weight of a hardening composition of the present invention may comprise water.

A specific embodiment of hardening composition that incorporates teachings of the present invention includes 15%, by weight, LUDOX® HSA, 0.5%, by weight, non-ionic surfactant, with the balance (i.e., 84.5%, by weight) comprising water. Another specific embodiment of hardening composition includes 15%, by weight, LUDOX® HSA, 0.3%, by weight, anionic surfactant, with the balance (i.e., 84.7%, by weight) comprising water.

A hardening composition that incorporates teachings of the present invention may be applied to and allowed to penetrate into concrete. Application of the hardening composition may be effected by spraying, alone or in combination with brushing, or brooming, the hardening composition into the surface to which the hardening composition is applied. Of course, other suitable application techniques are also within the scope of the present invention.

In one embodiment of an application method according to the present invention, the hardening composition is applied to a surface of material (e.g., concrete) that has been substantially cured or fully cured. Prior to applying the hardening composition, any debris is cleared from the surface to which the hardening composition is to be applied. Additionally, that surface may be planed, honed, and/or polished (e.g., with a 100 grit (rougher) to 400 grit (finer) pad or polishing compound). The hardening composition may be applied before or during the polishing process. Polishing may occur following the application of hardening composition to the surface, and may continue until, and even after, the surface is dry.

In another embodiment of a hardening composition application method, the hardening composition may be applied to a surface of uncured (e.g., fresh) concrete. As an example, the hardening composition may be applied within thirty minutes following finishing of the surface of the concrete. In another example, the hardening composition may be applied within about three hours after the surface of the concrete has been finished. The hardening compound may be applied to the concrete surface just before or at about the same time as any curing compounds are applied to the surface of the concrete. After the concrete has cured, the surface may be polished.

Once a hardening composition according to the present invention has been applied to a surface, penetrated into the surface, and had an opportunity to provide the desired results (e.g., chemically react with calcium hydroxide) (i.e., the hardening composition has dried), residue of the hardening composition may be removed, or cleaned, from the treated surface. The residue, which consists primarily of silica particles, may be removed from the treated surface simply by sweeping, blowing, or spraying it from the treated surface. No additional chemical treatment or labor (e.g., scrubbing, sanding, scraping, polishing, etc.) are required.

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed:

1. A composition for hardening and/or polishing concrete, consisting of:
    colloidal silica;
    a stabilizer for enabling the colloidal silica to remain in solution at a pH of less than 10;
    surfactant; and
    water,
    the composition being formulated not to form a hard reside on a surface of the concrete.

2. The composition of claim 1, having a pH of 8 or less.

3. The composition of claim 1, having a neutral pH.

4. The composition of claim 1, having a pH of about 3.5 or less.

5. The composition of claim 1, wherein silica particles of the colloidal silica have diameters of about 3 nm to about 50 nm.

6. The composition of claim 5, wherein the silica particles have diameters of 12 nm.

7. The composition of claim 1, wherein silica particles of the colloidal silica comprise about 1.5% to about 6% of a weight of the composition.

8. The composition of claim 7, wherein the silica particles comprise about 4.5% of the weight of the composition.

9. A composition for application to a surface of concrete, comprising:
   colloidal silica including silica particles with sizes that enable the silica particles to penetrate into the surface of the concrete to react with calcium hydroxide beneath the surface of the concrete; and
   a stabilizer enabling silica particles of the colloidal silica to remain in solution at a pH below 10,
   the composition formulated to harden the surface of the concrete without forming a hard residue on the surface.

10. The composition of claim 9, wherein silica particles of the colloidal silica have diameters of about 3 nm to about 50 nm.

11. The composition of claim 10, wherein the silica particles have diameters of about 12 nm.

12. The composition of claim 9, wherein the silica particles of the colloidal silica comprise about 1.5% to about 6% of a weight of the composition.

13. The composition of claim 9, wherein the colloidal silica comprises from about 5% to about 50% of a weight of the composition.

14. The composition of claim 9, wherein the stabilizer enables the silica particles to remain in solution at a pH of from about 3 to about 7.

15. The composition of claim 9, wherein the stabilizer enables the silica particles to remain in solution at a pH of about 3.5 or less.

16. A composition for application to a surface of concrete, comprising:
   colloidal silica including silica particles with sizes that enable the silica particles to penetrate into the surface of the concrete to react with calcium hydroxide beneath the surface of the concrete;
   a stabilizer enabling the silica particles to remain in solution at a pH below 10;
   surfactant; and
   water,
   the composition formulated to harden the surface of the concrete without forming a hard residue on the surface.

17. The composition of claim 16, wherein silica particles of the colloidal silica comprise about 1.5% to about 6% of a weight of the composition.

18. The composition of claim 16, wherein the colloidal silica comprises from about 5% to about 50% of a weight of the composition.

19. The composition of claim 16, wherein the stabilizer enables the silica particles to remain in solution at a pH of about 8 or less.

20. The composition of claim 9, wherein the stabilizer enables the silica particles to remain in solution at a pH of from about 3 to about 7.

* * * * *